US005626785A

United States Patent [19]

Rajnik et al.

[11] Patent Number: 5,626,785

[45] Date of Patent: May 6, 1997

[54] ELECTRODE ASSEMBLY AND METHOD

[75] Inventors: Lawrence S. Rajnik, Corning; David F. Thompson, Painted Post, both of N.Y.

[73] Assignee: Corning Incorporated, Corning, N.Y.

[21] Appl. No.: 93,207

[22] Filed: Jul. 16, 1993

[51] Int. Cl.$^6$ ..................... H05B 3/08; B60L 1/02; H01R 9/24

[52] U.S. Cl. ..................... 219/541; 219/205; 439/886

[58] Field of Search ..................... 219/541, 205, 219/206, 207, 208; 392/354, 484, 486, 493, 494; 174/65, 55, 151; 248/56; 439/886, 890

[56] References Cited

U.S. PATENT DOCUMENTS

| | | | |
|---|---|---|---|
| 1,093,237 | 4/1914 | Arnold | 219/205 |
| 1,345,473 | 7/1920 | Bemjamin | 174/65 SS |
| 1,805,155 | 5/1931 | Weeks | 174/65 SS |
| 2,542,583 | 2/1951 | Shea | 174/65 SS |
| 2,924,467 | 2/1960 | Burch | 174/151 |
| 3,748,551 | 7/1973 | Peterson | 174/151 |
| 4,193,012 | 3/1980 | Podiak et al. | 313/137 |
| 4,375,011 | 2/1983 | Grunau | 174/65 SS |
| 4,379,204 | 4/1983 | Perrault | 174/65 SS |
| 4,883,643 | 11/1989 | Nishio et al. | 422/94 |
| 4,980,601 | 12/1990 | Aoki et al. | 313/143 |
| 5,238,650 | 8/1993 | Sheller | 422/174 |

FOREIGN PATENT DOCUMENTS 2251631 5/1973 Germany .

OTHER PUBLICATIONS

SAE Technical Paper Series 920093, Electrically Heated Extruded Metal Converters for Low Emission Vehicles, Feb. 24–28, 1992.

LAVA, Custom Ceramics for Electrical, Electronic and Technical Uses, Maryland Lava Company, Inc.

Fighting Pollution with Cellular Ceramics, Corning Incorporated, Annual Report 1992.

*Primary Examiner*—Teresa J. Walberg
*Assistant Examiner*—Sam Paik
*Attorney, Agent, or Firm*—Kees van der Sterre

[57] ABSTRACT

Assembly and method of installing an electrode of a predetermined size and configuration in an electric heater envelope having an electrode opening at a preselected position. The assembly and associated method consist of affixing a hollow compression fitting about or within the electrode opening and providing a sleeve of a refractory deformable dielectric material within the fitting through which the electrode passes into the envelope. Dielectric spacing means are positioned between the electrode and electrically conductive portions of the fitting or envelope to prevent electrical conduction therebetween. Compression fastening means are then provided, securable to the fitting, to impart sufficient compressive force to the assembly to deform the sleeve about the electrode, thereby effectively sealing and securing the electrode within the fitting without the electrode grounding against the fitting or the envelope.

10 Claims, 2 Drawing Sheets

FIG. 3
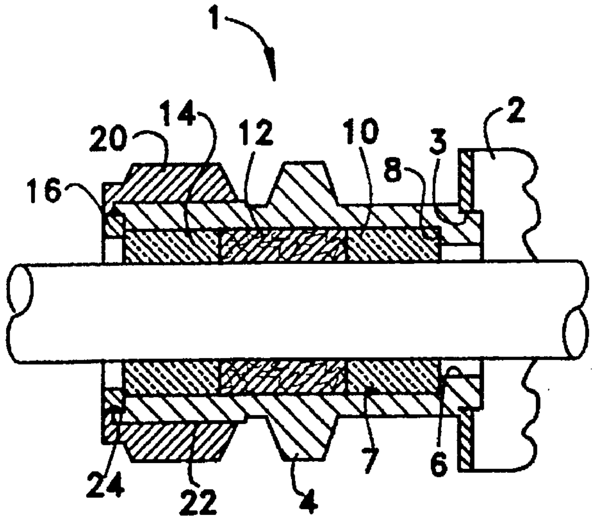
FIG. 4
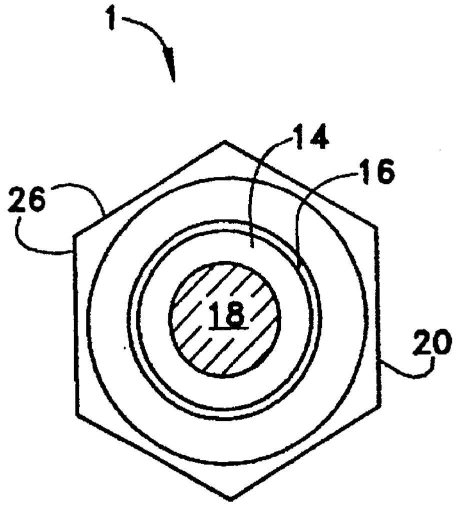
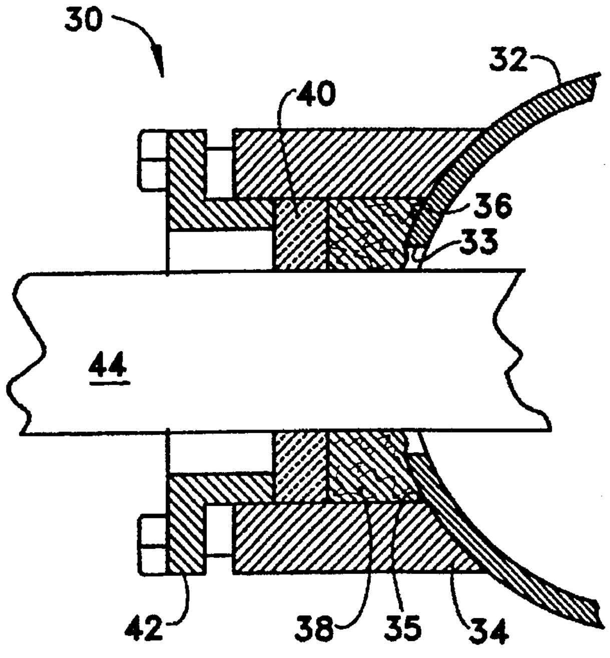
FIG. 5
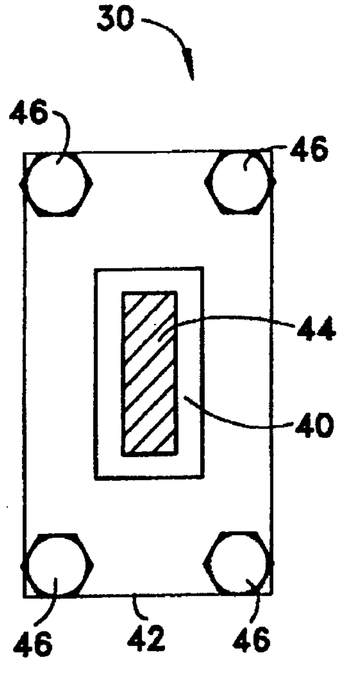
FIG. 6

ELECTRODE ASSEMBLY AND METHOD

BACKGROUND OF THE INVENTION

The present invention relates generally to electric resistance heaters, most typically heaters associated with catalytic converters, and more specifically to envelopes or enclosures containing electrically heatable catalytic converters and which have an electrode installed therein to preheat the catalyst contained within the converter envelope.

Catalytic converters are commonly employed commercially in the automotive industry for reducing internal combustion engine exhaust emissions such as nitrogen oxides, carbon monoxide, and various hydrocarbons. Typically, a catalyst contained within a catalytic converter does not effectively treat exhaust gases until the catalyst within the converter has been heated by the exhaust gases to a temperature in which the catalyst is able to become active. Thus, there is a period of time during the initial start-up of a cold engine when the exhaust gases are not being fully treated by the catalyst. This results in an increased quantity of undesired emissions being released to the atmosphere.

One tactic to reduce the quantity of undesired exhaust emissions during the cold engine start-up phase is to preheat the catalyst in order that the catalyst can be active during this phase. Electrically heating the catalyst with electric resistance heating units has proven to be a convenient and expedient method of preheating the catalyst prior to, and during, the cold engine start-up phase.

As a result of employing electric resistance heating units to preheat the catalyst in catalytic converters, there has developed a need to provide reliable electrode assemblies that lend themselves to being easily installed in the heater envelope without inducing exhaust gas leaks about the electrode. Achieving a reliable and simple electrode installation is complicated by the fact that these converters are rapidly and repeatedly heated to temperatures on the order of 1000° C. in use. This involves significant thermal expansion and contraction as the units repeatedly cycle from low ambient temperatures to the relatively high operating temperatures associated with rapid catalytic oxidation. Of course, at electrode installation and throughout the life of the catalyst unit, the electrode installation arrangement must not allow the electrode to make electrical contact, or ground, with the heater envelope.

Thus, it can be appreciated that there is a need in the art to provide electrode assemblies, and methods of electrode installation, which will withstand the adverse conditions in which electric heaters for catalytic converters operate. It can also be appreciated that such electrode assemblies must not be unduly complex, and that the method of electrode installation be easily and readily carried out on an assembly line with minimal added converter manufacturing costs.

SUMMARY OF THE INVENTION

Accordingly, it is a principal object of the present invention to provide an electrode assembly for an electrical heater assembly, and a method for using it, which are cost effective and provide a durable electrical powering system for repeated high temperature heater operation.

It is a further object of this invention to provide an electrode assembly that is electrically insulated, able to withstand high operating temperatures, and capable of providing a gas-tight seal effective to prevent leakage of the exhaust gases passing through the heater.

These, and other objects, are achieved by a method for mounting an electrode of a predetermined size and configuration in an electric heater envelope having an electrode opening at a preselected position in the envelope wall. The electric heater envelope or enclosure may contain a heater alone, or a heater in combination with a catalytic conversion unit. A preferred example of the latter is an electrically heated catalytic conversion unit.

In accordance with our method an electrode is mounted in such an envelope through an electrode opening formed at a preselected position in a wall of the envelope. A hollow fitting is provided at the opening on the envelope wall, that fitting having a through bore which is in registry with the electrode opening. Generally a circumferential stop, configured to form a lip, step, or ledge constriction in the bore, is provided by the fitting and/or the envelope wall.

In typical embodiments at least one of the envelope wall, fitting or stop is formed in whole or in part of metal. Thus one or more of these components will comprise electrically conductive portions, which portions are to be electrically isolated from the electrode and the electrical heater within the envelope, by means described below.

The selected electrode in the form of an elongated body is inserted through the bore of this fitting, while additionally providing, between the electrode and bore, at least one sleeve of a relatively deformable, high-temperature-resistant, dielectric material. In addition, at least one rigid spacing element formed of a high-temperature-resistant dielectric material is provided between the electrode and the electrically conductive portions. The latter material is provided to prevent electrical contact between the electrode and conductive portions of the wall, fitting or stop within the bore as above described.

To firmly secure the electrode within the bore, removable sleeve compression means are attached to the fitting. This attachment is accomplished contemporaneously with the application to the deformable sleeve of compressive force at least sufficient to bring the sleeve into sealing conformity with the electrode and bore. The sleeve of deformable dielectric material, having a composition such as hereinafter more fully described, will exhibit both the capacity to deform about the electrode, for good sealing, and high thermal durability and refractoriness for dependable operation over a prolonged service period.

In another aspect the invention resides in an electrode assembly for providing an electrode in an electric heater envelope such as above described. The wall of the electric heater envelope will incorporate the desired electrode opening, at or within which opening is located a hollow compression fitting, attached to the envelope wall. The fitting has a through bore for an electrode which is in registry with the electrode opening.

Within the bore is disposed at least one sleeve of a relatively deformable, high-temperature-resistant dielectric material situated such that stop means, within or proximate to the bore, provide a bore constriction which retains the sleeve within the bore.

The electrode for connecting with the electric heater within the envelope passes through the wall, bore and sleeve of deformable material. Since at least one of the envelope wall, fitting, or stop comprise electrically conductive portions, at least one rigid spacing element formed of a high-temperature-resistant dielectric material is positioned between the electrode and the electrically conductive portions. This spacing element, typically a dielectric coating or sleeve encircling and insulating the electrode, prevents electrical contact between the electrode and conductive portions.

To complete the electrode assembly, sleeve compression means are secured to the compression fitting proximate to the electrode. Such compression means are in pressure-transmitting (either direct or indirect) contact with the sleeve of deformable material, compressing that sleeve against the stop to configure and maintain it in sealing conformity with both the electrode and bore. Thus close conformance and an effective seal between the electrode and the deformable material and compression fitting are achieved.

BRIEF DESCRIPTION OF THE DRAWINGS

FIG. 3 is a cutaway side view of a first alternative embodiment of the disclosed electrode assembly.

FIG. 4 is an end view of the embodiment of the electrode assembly shown in FIG. 3.

FIG. 5 is a cutaway side view of a second alternative embodiment of the disclosed electrode assembly.

FIG. 6 is an end view of the alternative embodiment of the electrode assembly shown in FIG. 5.

DETAILED DESCRIPTION OF THE INVENTION

In the presently preferred method for practicing the invention, the fitting provided in the electrode opening of the heater envelope is a gland fitting. This fitting, which includes a gland housing and a gland cap, can be sealed into an opening in the envelope wall by soldering, welding, or any other suitable method.

The gland housing has a through bore including an inner circumferential bore constriction or stop at the base end of the housing (the end nearest the interior of the envelope). To seal an electrode into this fitting, a sleeve of a relatively deformable dielectric material, typically sized to fit relatively closely against the electrode and bore of the fitting, is placed into the housing formed by the bore. Since the outside diameter of the sleeve is larger than the bore constriction, the sleeve is retained in the bore by the constriction.

To maintain separation and electrical isolation between the electrode and the gland fitting, which is typically formed of metal, a rigid spacing element in the form of a high-temperature-resistant dielectric ceramic coating is provided on at least selected surface portions of the electrode. The portions selected are those surface portions which will be proximate to the electrically conductive portions of the gland fitting in use.

A coated electrode such as described is sealed into the fitting by securing sleeve compression means to the fitting, such means acting to force the deformable sleeve against the bore stop, electrode and inner wall of the gland housing. The sleeve compression means in the present embodiment is a gland cap, typically formed of a metal which is the same as or compatible with the metal of the gland housing. As with the housing, electrical separation between the cap and the electrode is maintained by means of the dielectric coating bonded to the surface of the electrode.

To obtain proper sealing of the electrode within the fitting, a load is applied to the gland cap to achieve deformation of the sleeve within the housing, and the cap is then sealed to the gland housing by soldering, welding, or any other suitable means. The load applied during sealing will be sufficient to bring the deformable sleeve into sealing conformity with the outer surface of the electrode and the gland bore. Proper sealing both reduces gas leakage through the seal and prevents the electrode from shifting position in the fitting during use. Shifting should be minimized in order to reduce the risk of potential grounding electrical contact between the electrode and gland fitting components.

Figure 1:
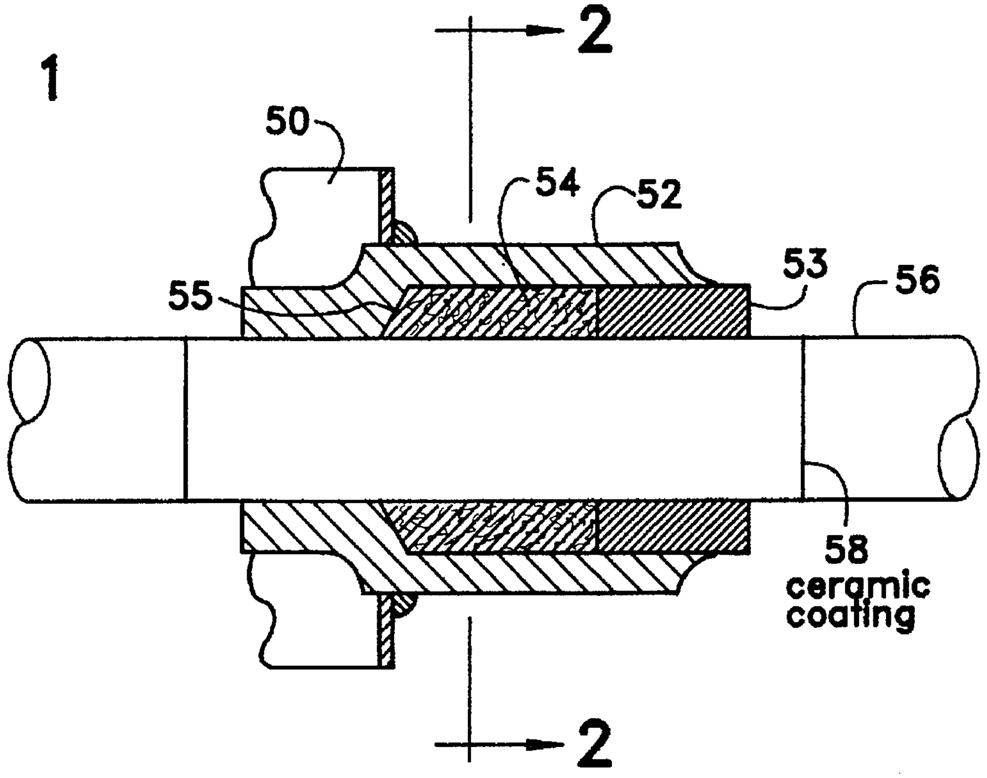
FIG. 1 is a cutaway side view of a preferred embodiment of an electrode assembly of the invention.
Figure 2:
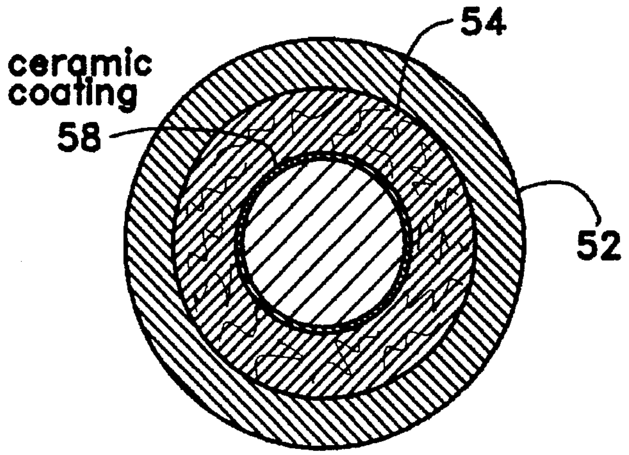
FIG. 2 is a cross-sectional end view of the embodiment of the electrode assembly of FIG. 1 through section 2—2 of FIG. 1.

A schematic illustration of this preferred sealed electrode assembly is shown in FIGS. 1 and 2 of the drawing. FIG. 1 presents a cutaway side view of the preferred seal assembly provided as above described, while FIG. 2 is a cross-sectional end view of the assembly taken through section 2—2 of FIG. 1. To be noted in connection with these and the various other cross-sectional, cutaway, and end views presented in the drawings is the fact that they are intended as schematic illustrations only, with no effort to represent true proportion or actual scale.

As shown in FIG. 1, a gland fitting comprising a gland housing 52 and a gland cap 53 contains a sleeve of high-temperature-resistant relatively deformable dielectric material 54, positioned in the bore of housing 52. The gland fitting is sealed by welding or the like to an opening in the wall of a heater envelope 50, shown in breakaway portion only.

Sleeve 54, composed for example of steatite (block talc), is retained within the bore in part by gland cap 53 and in part by a constriction or circumferential protrusion 55 in the bore wall. Gland cap 53 is sealed to housing 52 by welding, these components being formed, for example, of stainless steel and thus being electrically conductive. A particular example of a suitable steatite material for sleeve 54 is Lava™ Grade A or Grade M machined stone material, commercially available from the Maryland Lava Company of Bel Aire, Md., U.S.A.

Traversing the fitting and sleeve 54 within the fitting bore is electrode 56, composed for example of stainless steel. Due to pressure applied by gland cap 53 to sleeve 54, the sleeve conforms closely to the inner wall of the bore and the outer surface of electrode 56. Thus a gas seal between the fitting and electrode is provided.

Electrical isolation between electrode 56 and fitting components 52 and 53 is maintained by a coating 58 of a refractory dielectric ceramic material, disposed on part of the surface of electrode 56. This coating may suitably comprise a layer of polycrystalline alumina ceramic bonded to the surface of the electrode.

In assembly and during use, dielectric coating 58 acts as a rigid dielectric spacing element around the electrode, maintaining electrical separation between the electrode and gland fitting components. Particular advantages of this seal assembly include simplicity of design, reduced part count, and reduced weight.

In one alternative embodiment of the method of the invention, an electrode of a predetermined size and configuration is secured to an electric heater envelope using a combination of deformable and rigid spacing sleeve components. These are used in a compression fitting having a stepped bore, including a larger bore stepped to a smaller bore and with both the larger and smaller bores being sized larger than the electrode. The step between the larger and smaller bores provides a seat therebetween, and the fitting is affixed to the envelope so that the bores are in registry with the electrode opening and the seat is outwardly facing with respect to the envelope interior.

After the fitting has been attached, a first sleeve made of a relatively rigid, high-temperature-resistant dielectric material is inserted in the larger bore of the fitting and axially positioned against the outwardly facing seat of the fitting. A second sleeve made of a relatively deformable, high-temperature-resistant dielectric material is also inserted in the larger bore of the fitting and axially positioned against the first sleeve. Finally, a third sleeve made of a relatively rigid, high-temperature-resistant dielectric material is inserted in the bore of the fitting and axially positioned against the second sleeve within the bore of the fitting.

After insertion of these sleeves, optional washer means may be positioned against the third sleeve if desired, such washer means typically being sized and configured to avoid contact with the electrode. The electrode is then inserted through the washer, the sleeves, and the electrode opening, and removable electrode encircling sleeve compression means such as a compression nut is secured about the outer end of the compression fitting. The latter means are secured tightly to apply compressive force to the sleeves, the tightening force used being at least sufficient to deform the second sleeve about the electrode, thereby effectively sealing and securing the electrode within the fitting without causing the electrode to ground against the fitting or the heater envelope.

An illustration of an electrode assembly provided according to the method of this embodiment is illustrated in FIGS. 3 and 4 of the drawing. That assembly includes an electrode assembly 1, shown as it would be installed in an electric resistance heater envelope 2. Heater envelope 2 has an electrode opening 3 which is located at a predetermined position on the envelope.

As best seen in the side cutaway view of FIG. 3, opening 3 is appropriately sized and configured to accommodate an electrode therein, such as electrode 18. A hollow compression fitting 4, preferably formed of a metal material, is positioned to encompass opening 3, one end of fitting 4 being hermetically affixed or attached to envelope 2. This attachment may be by appropriate means such as welding, brazing, threaded joints, chemical bonding, or the like.

In the embodiment shown, fitting 4 is provided with a bore 6 and a bore 7 of differing inside dimensions, thereby presenting a step, or seat 8, within the interior of fitting 4 which faces away from envelope 2. As shown, the inside dimension of bore 6 will be slightly less than the inside dimension of bore 7 in order to provide the step or seat 8. Bore 6 is slightly larger than electrode 18 in order that electrode 18 will not contact bore 6 as it is axially positioned centrally therein.

A first sleeve 10 made of a relatively rigid, high temperature resistant, dielectric material is sized to be axially positioned within bore 7 and is also sized to seat against step or seat 8. That is, first sleeve 10 is longitudinally inserted into bore 7 but not bore 6. A second sleeve 12 made of a relatively deformable, high-temperature-resistant dielectric material is sized for axially positioning within bore 7 against first sleeve 10.

A third sleeve 14 made of a relatively rigid, high temperature resistant, dielectric material is sized to be axially positioned within bore 7 against deformable sleeve 12. Sleeves 10, 12 and 14, being hollow, are internally dimensioned and configured to allow an electrode 18 to be inserted through each of the sleeves. Electrode 18 fits snugly within sleeves 10, 12, and 14 so that an initial accurate positioning of the electrode within at least sleeves 10 and 14 can be achieved.

First sleeve 10 and third sleeve 14 are composed of a refractory ceramic dielectric material, suitably a ceramic consisting at least predominantly of aluminum oxide and most preferably a ceramic consisting essentially of aluminum oxide. Of course, other rigid refractory ceramics including, for example, ceramics made of cordierite, magnesia, zirconia, or composites of these or other materials, could alternatively be employed.

Second sleeve 12 is suitably made of a deformable ceramic material such as steatite (block talc), soapstone, talc, or the like, the preferred material being the steatite material hereinabove described. Other similarly deformable fibrous or porous refractory ceramics which can be compressed to provide a relatively durable seal may of course be substituted for these materials if desired.

As previously noted, important characteristics of the dielectric materials used for both of the above types of sleeves include high refractoriness and thermal durability. Hence, the materials used must exhibit strength and refractoriness sufficient to provide sleeve shape retention to at least about 1000° C. For this reason the use of refractory ceramic dielectric materials for these sleeves is greatly to be preferred.

As further shown in FIG. 3, a flat washer 16 is desirably provided exteriorly of but axially positioned against rigid third sleeve 14. Washer 16 need not be sized to fit within bore 7, as it is preferable for washer 16 to be external of fitting 4. This permits a compression nut or the like to be attached to the fitting in contact with washer only, thus providing pressure-transmitting contact but not direct sliding, frictional or stressful point contact between the compression nut and the dielectric sleeves.

As can be seen in FIG. 3, washer 16 is provided with a central opening somewhat larger than the outer nominal diameter of electrode 18 in order to ensure that washer 16 does not come into contact with electrode 18 after assembly 1 has been installed.

A removable flange or compression nut 20 is provided, having a central opening whereby the nut may encircle electrode 18 as the former is attached to the end of fitting 4. Flange 20 is suitably secured to the free end of fitting 4 by means of co-acting screw threads at interface 22, ie., on the exterior periphery of fitting 4 and the interior surface of flange 20. Flange 20 is also provided with an internal relief, or ledge 24, which serves to retain washer 16 in the proper position against rigid sleeve 14 upon electrode assembly 1 being completely assembled.

An end view of assembly 1 is shown in FIG. 4 of the drawings, the exterior of envelope 2 having been omitted for clarity. As can be seen in FIG. 4, compression nut 20 is provided with multiple faces 26 about the periphery thereof to facilitate the grasping of nut 20 by a wrench, or other tool, in order to rotate compression nut 20 thereby engaging co-acting threads at interface 22 located on the interior of nut 20 and the exterior of the free end of fitting 4. Upon securing compression nut 20, there will be sufficient force imparted upon the sleeves 10, 12, and 14 to cause sleeve 12 to deform about electrode 18 thereby effectively sealing and securing electrode 18 within fitting 20.

It is preferred that electrode 18 have a circular cross-section due to such a cross-section offering superior sealing characteristics when installed and secured within the assembly, however, other geometries may be used. As suggested by the foregoing description, the step of affixing the fitting to the envelope could comprise welding, brazing, threaded coupling, chemical bonding, or any other method offering a way to insure sealing contact between the fitting and the wall of the enclosure to be fitted.

A second alternative embodiment of the method of the invention utilizes the heater envelope itself to provide part of the retaining structure. One of two ends of a hollow compression fitting is first affixed to the envelope so as to encompass an electrode opening in the envelope wall. The fitting has a bore sufficiently large that a residual lip or ledge, formed by the envelope wall itself, is presented at the point of attachment of the fitting to the envelope. This lip provides a step between the electrode opening in the wall and the bore of the fitting.

In further steps of the method, a first sleeve is inserted and axially positioned in the bore of the fitting, that sleeve being made of a relatively deformable, high temperature resistant, dielectric material. This sleeve is positioned in the interior of the fitting against the lip therein. Also, a second sleeve, made of a relatively rigid, high-temperature-resistant dielectric material, is inserted and axially positioned in the interior of the fitting against the first sleeve. The electrode is inserted through the fitting, first and second sleeves, and enclosure wall as described, and removable electrode encircling compression means such as a compression flange are secured to the remaining or outer end of the fitting.

Attachment of the flange is accomplished with compressive tightening, so as to impart to the sleeves a compressive force which forces the sleeves against the lip and is sufficient to deform the first sleeve about the electrode. In this way the electrode is secured and sealed within the fitting without causing grounding against the fitting or the envelope.

An electrode assembly provided in accordance with this second alternative method is configured as illustrated in FIGS. 5 and 6 of the drawings. FIG. 5 of the drawing is a cutaway side view of alternative electrode assembly 30, shown as it would be installed on breakaway portion 32 of a heater envelope such as a catalytic converter envelope.

Electrode opening 33, located at a predetermined position on converter envelope 32, is sized and configured to accommodate an electrode of selected configuration therein, such as electrode 44 shown broken away in FIG. 5. A hollow compression fitting 34 having an interior bore 35 is shown encompassing electrode opening 33.

Fitting 34 is hermetically affixed or attached to envelope 32 by attachment means such as welding, brazing, threaded coupling, chemical bonding or the like. A portion of envelope 32, which also defines electrode opening 33, extends beyond the interior periphery of bore 35 to form a lip 36 at the attached end of fitting 34.

A first sleeve 38, made of a relatively deformable, high-temperature-resistant dielectric material is sized for axial positioning in the interior of compression fitting 34 against lip 36. It is preferable that sleeve 38 extend inwardly beyond lip 36 formed by electrode opening 33 in order to prevent electrical grounding of electrode 44 against the lip. Suitable materials for forming sleeve 38 include steatite, soapstone, or talc.

A second sleeve 40, made of a relatively rigid, high-temperature-resistant dielectric material is sized and configured for axial positioning within fitting 34 against first sleeve 38. Aluminum oxide is a particularly suitable material from which sleeve 40 may be made. Sleeves 38 and 40 are both sized to fit snugly about electrode 44.

Electrode 44 is positioned and secured within fitting 34 and sleeves 38 and 40 by a compression flange 42 encircling electrode 44. Flange 42 is removably secured to fitting 34 and drawn tight against sleeves 38 and 40 by means of threaded bolts 46. This tightening compresses the sleeves against lip 36 and effects a deformation of sleeve 38 about electrode 44 which seals and secures electrode 44 within fitting 34.

In the embodiment shown, flange 42 has an L-shaped cross-section in order to provide a space between the flange and fitting 34. This space insures that interference between the flange and the fitting during installation of the electrode will not interfere with the application of compressive force to the sleeves.

An end view of assembly 30 is shown in FIG. 6 of the drawings. As shown in FIG. 6, assembly 30 may readily be constructed to accommodate a rectangular electrode, such as electrode 44. Of course, assembly 30 may be constructed to accommodate electrodes of any other arbitrarily selected electrode geometry, as desired.

In some designs incorporating rigid spacing sleeves, it can be difficult to achieve sufficiently close control over the relative dimensions of the electrode and the sleeves to avoid the possibility that some deformable high-temperature-resistant dielectric material will escape from the assembly. To avoid this possibility, optional close-fitting washers of refractory felt material, such as for example, of Fiberfrax® refractory insulation material, may be positioned between the deformable sleeve and adjoining rigid sleeves, metal stops, or other compression components. These washers act to prevent the possible loss of the deformable sealing material under conditions of high vibration.

While the invention has been particularly described above with respect to specific examples of compositions, materials, apparatus and/or procedures, it will be recognized that those examples are presented for purposes of illustration only and are not intended to be limiting. Thus numerous modifications and variations upon the compositions, materials, processes and apparatus specifically described herein may be resorted to by those skilled in the art within the scope of the appended claims.

We claim:

1. A method for mounting an electrode in an envelope enclosing an electric heater for combustion engine exhaust gas connected to the electrode which comprises the steps of:

(a) providing an electrode opening in a wall of the envelope;

(b) providing a hollow fitting on the envelope wall, the fitting having a through bore which is in registry with the electrode opening;

(c) providing a circumferential stop within or proximate to the bore;

(d) positioning an electrode within the bore;

(e) providing between the electrode and bore at least one sleeve of a relatively deformable, high-temperature-resistant, dielectric material;

(f) providing at least one rigid spacing element formed of a high-temperature-resistant dielectric material between the electrode and adjacent electrically conductive portions of the envelope, fitting, and stop;

(g) securing sleeve compression means to the fitting while applying to the deformable sleeve a compressive force at least sufficient to bring the sleeve into sealing conformity with the electrode and bore, such that the electrode assembly provides an electrically insulated, gas-tight seal effective to prevent exhaust gas leakage from the envelope at high temperatures.

2. A method in accordance with claim 1 wherein the hollow fitting is a gland housing, wherein the sleeve compression means is a gland cap, and wherein the spacing element is a coating of high-temperature-resistant dielectric material bonded to the surface of the electrode.

3. A method in accordance with claim 2 wherein the coating consists at least predominantly of alumina.

4. A method in accordance with claim 2 wherein the step of securing comprises attaching the gland cap to the gland by welding.

5. A method in accordance with claim 2 wherein the sleeve of relatively deformable material is composed at least predominantly of a ceramic material selected from the group consisting of steatite, soapstone, and talc.

6. An electrode assembly for mounting an electrode in an electric heater envelope for combustion engine exhaust gas having a wall incorporating an electrode opening, the assembly comprising:

(a) a hollow compression fitting on the wall of the heater envelope at the electrode opening, the fitting having a through bore for an electrode which is in registry with the electrode opening;

(b) at least one sleeve composed of a relatively deformable, high-temperature-resistant dielectric material positioned within the bore;

(c) stop means within or proximate to the bore for providing a bore constriction for retaining the sleeve within the bore;

(d) an electrode passing through the sleeve and traversing the bore and electrode opening;

(e) at least one rigid spacing element formed of a high-temperature-resistant dielectric material positioned between the electrode and adjacent electrically conductive portions of the envelope, fitting and stop;

(f) sleeve compression means secured to the compression fitting proximate to the electrode, such that the electrode assembly provides an electrically insulated, gas-tight seal effective to prevent exhaust gas leakage from the envelope at high temperatures.

7. An electrode assembly in accordance with claim 6 wherein the sleeve of deformable material is composed at least predominantly of a dielectric ceramic selected from the group consisting of steatite, soapstone, and talc.

8. An assembly in accordance with claim 6 wherein the rigid spacing element comprises a dielectric coating bonded to the surface of the electrode.

9. An assembly in accordance with claim 8 wherein the dielectric coating is composed at least predominantly of alumina.

10. An assembly in accordance with claim 6 wherein the fitting is a gland and the sleeve compression means comprises a gland cap welded to the gland.

* * * * *